R. C. GRAVES,

Assignor to D. R. GOULD.

FURNACE GRATE.

No. 9,959. Reissued Dec. 6, 1881.

WITNESSES

E. A. Shalen.

H. C. Fogg.

INVENTOR

Robert C. Graves by his attys

Charles E. Rogers and

THE NORRIS PETERS CO., PHOTO-LITHO., WASHINGTON, D. C.

UNITED STATES PATENT OFFICE.

ROBERT C. GRAVES, OF BARNESVILLE, OHIO, ASSIGNOR TO DAVID R. GOULD, OF BOSTON, MASSACHUSETTS.

FURNACE-GRATE.

SPECIFICATION forming part of Reissued Letters Patent No. 9,959, dated December 6, 1881.

Original No. 126,285, dated April 30, 1872. Application for reissue filed September 1, 1881.

*To all whom it may concern:*

Be it known that I, ROBERT C. GRAVES, of Barnesville, in the county of Belmont and State of Ohio, have invented a new and valuable Improvement in Grates, of which the following is a full, clear, and exact description, reference being had to the accompanying drawings, forming a part of this specification, in explaining its nature, in which—

Figure 1:
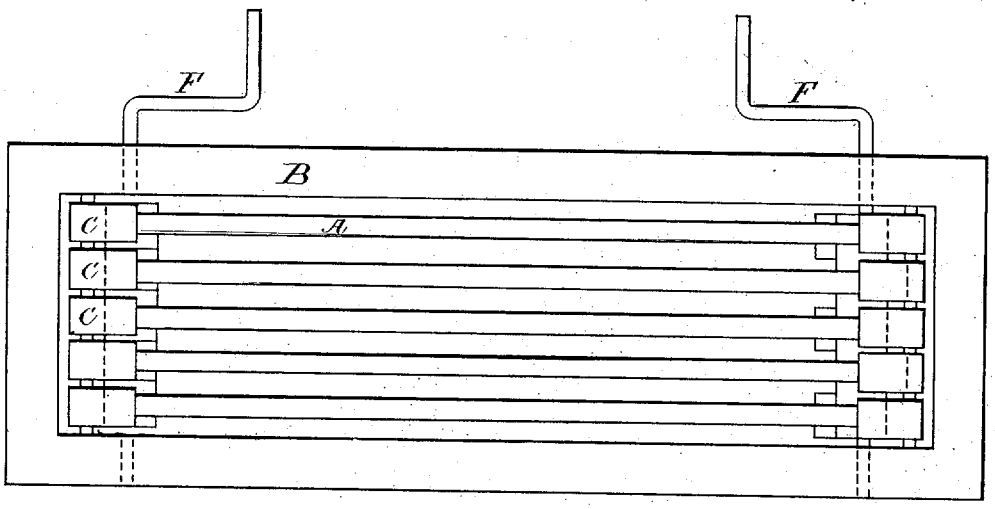
Figure 2:
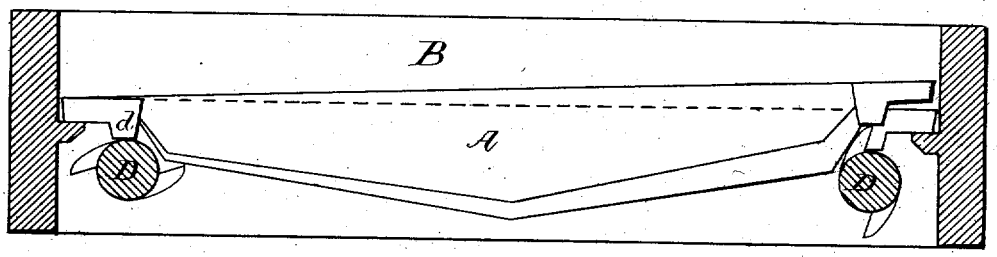

Figure 1 is a plan view of my grate. Fig. 2 is a vertical longitudinal section of the same.

My invention relates to fire-grates; and it consists in the construction and novel arrangement of the grate-bars, and of rotary cams used in connection therewith, as hereinafter described.

The object of my invention is to provide means for gradually lifting the grate-bars, with their load, and letting them fall suddenly and alternately as the cams are rotated, thus producing a sufficient agitation of the coal-bed without the exercise of undue strength in turning the cam-shaft.

In the drawings, A represents a number of parallel grate-bars laid loosely within the fire-box or furnace B, their ends resting on cleats or ledges *b*. The grate-bars are constructed with rectangular enlargements C at their ends, and with projections *d* near the inner ends or shoulders, and on the under sides of said enlargements.

Figure 3:
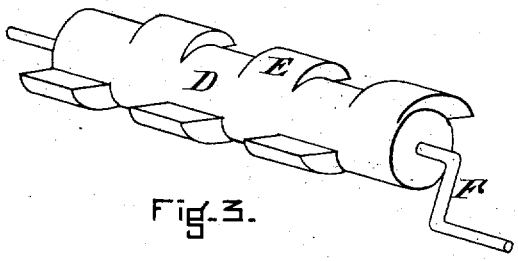

D represents shafts journaled transversely near the ends of the grate-bars, and constructed with the wipers E arranged on opposite sides, and in the alternate order shown in Fig. 3. These shafts are operated by cranks F. At every revolution of one shaft the adjacent end of every alternate bar is raised and tripped, all the bars being raised and dropped at every full revolution. In the rotation of the wiper-shaft the rounded part of the wipers come in contact with the projections *d*. The bars when not in motion rest on the cleats *b*. It is intended to rotate one of the shafts at a time only.

The enlargements C serve to keep the bars apart and to prevent the ashes or clinkers from getting between their ends and clogging the operation of parts.

Having thus fully described my invention, I claim and desire to secure by Letters Patent of the United States—

1. The loose grate-bars A, having the enlargement C and projections *d*, in combination with the wiper-shafts D, having the alternate curved cam-projections, terminated by abrupt shoulders, as and for the purposes described.

2. The combination of separate or disconnected grate-bars loosely held at their ends by suitable supports, with a shaft extending beneath the fire-supporting surface of the bars, at right angles to their length, and cams or projections thereon, adapted by the revolution of the shaft to be brought in contact with the grate-bars and lift them from their supports, whereby upon the turning of the shaft the grate-bars are lifted and let fall, all substantially as and for the purposes described.

3. The combination, in a grate-bar, of separate or disconnected grate-bars loosely held at their ends by suitable supports, with a shaft independent of said supports extending beneath the fire-supporting surface of the grate-bars, at right angles to their length, and two sets of cams or projections oppositely disposed thereon, and adapted upon the revolution of the shaft to come in successive contact with alternate grate-bars, whereby each alternate bar is lifted simultaneously and let fall, while the intermediate bars are stationary, and the said intermediate bars are then lifted and let fall, while those first operated are at rest, all substantially as and for the purposes described.

4. The combination of separate or disconnected grate-bars and the shaft extending at right angles to the length of the grate-bars, having two sets of cams or projections oppositely and alternately disposed thereon, as shown, whereby upon operating the shaft the cams or projections are brought in contact with the grate-bars, and impart to them abrupt vertical movements in alternate groups, substantially as and for the purposes described.

5. As a means of providing a grate-bar with an abrupt vertical movement, a cam or projection adapted to be brought in contact with the bar to lift it, and to be withdrawn to let it fall, in combination with independent supports for the grate-bar, all substantially as and for the purposes described.

6. The combination of separate or disconnected grate-bars, their supports, a shaft extending at right angles to the length of the grate-bars, and cams or projections thereon, whereby when the shaft is stationary the bars all rest upon the supports, and when the shaft is turned the bars are lifted and let fall upon their supports in successive or alternate groups, all substantially as and for the purposes described.

7. The combination of a fire-supporting surface or grate with two cams for lifting and letting fall the same, one of which is arranged to lift and let fall one portion before the action of the other, and the other of which is adapted to lift and let fall the remaining portion while that first operated is at rest, all substantially as and for the purposes described.

8. The combination of a fire-supporting surface with a shaft extending at right angles to the length of the grate-bar, and cams oppositely disposed thereon to come in successive contact with the grate, whereby upon the turning of the shaft one portion of the fire-supporting surface is lifted and let fall, and upon the further turning of the shaft the other portion of the fire-supporting surface is lifted and let fall, all substantially as and for the purposes described.

ROBERT C. GRAVES.

Witnesses:
C. H. GRAVES,
G. McDONALD.